CONSTANT BANDWIDTH CAPACITIVELY TUNED CIRCUITS

Filed July 15, 1966 4 Sheets-Sheet 1

INVENTOR:
EUGENE K. VON FANGE,
BY [signature]
HIS ATTORNEY.

LOW RANGE VHF TUNED CIRCUIT

HIGH RANGE VHF TUNED CIRCUIT

DETERMINATION OF SOURCE SHUNTING INDUCTANCE LG AT f= 85 mc/s (CH. 6) TO PROVIDE DESIRED RS (EQUIV. SERIES RES)

RESULTANT PRIMARY SERIES CIRCUIT RESONANT AT f= 85 mc/s

INVENTOR:
EUGENE K. VON FANGE,
BY Julius J. Zaskalicky
HIS ATTORNEY.

FIG. 6A.

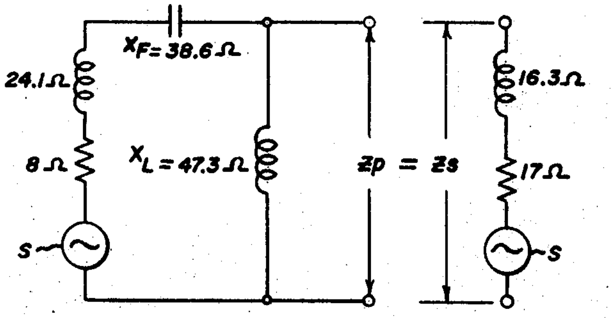

DETERMINATION OF ADDITIONAL SOURCE SHUNTING IMPEDANCE ($X_F - X_L$) AT $f = 57$ mc/s (CH. 2) TO PROVIDE SAME $R_S$ AS AT $f = 85$ mc/s

FIG. 6B.

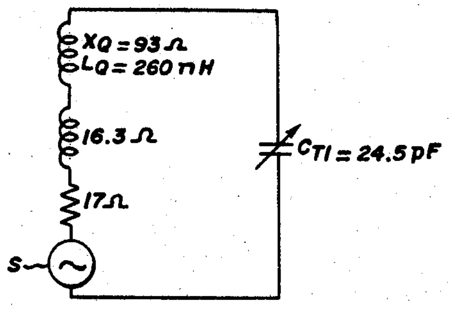

RESULTANT PRIMARY SERIES CIRCUIT RESONANT AT $f = 57$ mc/s

FIG. 6C.

$$f_{res} = \frac{1}{2\pi\sqrt{L_p C_p}} = 41\text{ mc/s}$$

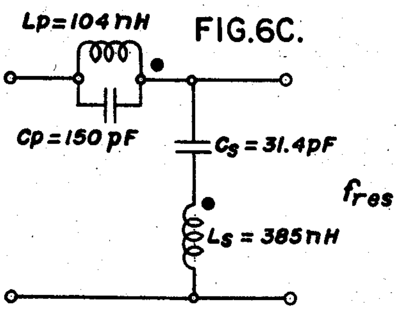

$$f_{res} = \frac{1}{2\pi\sqrt{L_s C_s}} = 46\text{ mc/s}$$

RESONANT CIRCUIT FOR PROVIDING I.F. REJECTION BETWEEN 41 mc AND 46 mc AND ALSO FOR PROVIDING REQUIRED $X_F$ AND $X_L$ AT $f = 57$ mc/s

INVENTOR:
EUGENE K. VON FANGE,
BY Julius J. Zaskalicky
HIS ATTORNEY.

CONSTANT BANDWIDTH CAPACITIVELY TUNED CIRCUITS

Filed July 15, 1966 4 Sheets-Sheet 4

FIG. 7A.

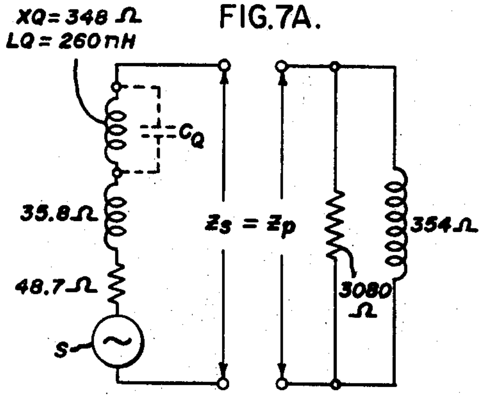

RESULTANT CIRCUIT OF THE PARALLEL COMBINATION OF RG AND $L_G$ IN SERIES WITH $L_Q$ AT f=213 mc/s (CH. 13) AND THE EQUIV. PARALLEL CIRCUIT.

FIG. 7B.

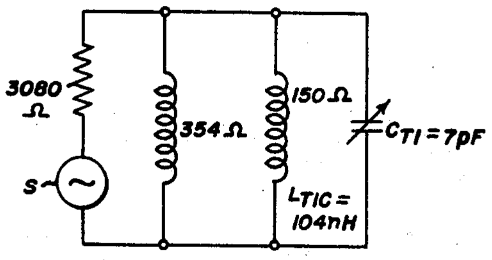

RESULTANT PRIMARY PARALLEL CIRCUIT RESONANT AT f = 213 mc/s

FIG. 8A.

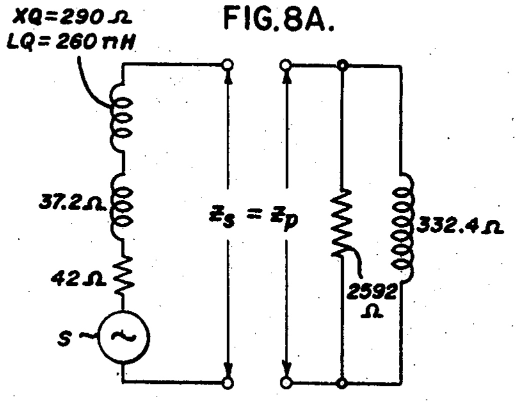

RESULTANT CIRCUIT OF THE PARALLEL COMBINATION OF RG AND $L_G$ IN SERIES WITH $L_Q$ AT f=177 mc/s (CH. 7) AND THE EQUIV. PARALLEL CIRCUIT.

FIG. 8B.

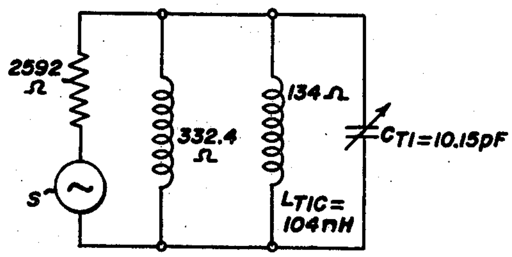

RESULTANT PRIMARY PARALLEL CIRCUIT RESONANT AT f = 177 mc/s

INVENTOR:
EUGENE K. VON FANGE,

BY Julius J. Zaskalicky
HIS ATTORNEY.

3,496,499
CONSTANT BANDWIDTH CAPACITIVELY TUNED CIRCUITS

Eugene K. Von Fange, Syracuse, N.Y., assignor to General Electric Company, a corporation of New York Filed July 15, 1966, Ser. No. 565,569
Int. Cl. H03j 3/20, 5/24
U.S. Cl. 334—56 6 Claims

ABSTRACT OF THE DISCLOSURE

Capacitively tuned circuits for providing selection of bands of frequencies substantially constant in width over ranges of frequencies, such as low channel and high channel VHF television frequencies, in response to the tuning thereof. In an illustrative embodiment of the invention, there is provided a capacitance-tuned circuit in which the capacitance is varied from a small value corresponding to resonance at the high end of the upper frequency range to a large value corresponding to resonance at the lower end of the low frequency range. To achieve constant bandwidth characteristics for the low range, a series resonant circuit is utilized. To achieve constant bandwidth for the upper range, a parallel resonant circuit is used. Conversion of the series resonant circuit to the parallel resonant circuit is effected by switching an inductance in shunt with the tuning capacitance over the high range of frequencies.

The present invention relates in general to tuned circuits, and more particularly it relates to tuned circuits for providing selection of bands of frequencies substantially constant in width over ranges of frequency in response to the tuning thereof.

The present invention has particular application in the radio frequency circuits of television receivers for the reception of the television transmission in the VHF ranges of frequencies. The VHF ranges of television transmission are essentially two in number, one from 54 megacycles to 88 megacycles, and the other from 174 megacycles to 216 megacycles and consists of twelve channels numbered two through thirteen, each of which has a bandwidth of 6 megacycles. Present design practice to obtain the selection of the desired band of frequencies or channel for processing into a picture by the television receiver is by utilization of parallel resonant circuits in which the inductive element thereof is varied to vary the tuning thereof. In current practice a different discrete inductance is used for each of the twelve channels, and in addition an adjustment means is provided for each of the inductances to obtain a precise tuning to desired channel. Such elements have been utilized principally for the reason that in parallel resonant circuits the bandwidth is a function of the resistance and capacitance of the parallel circuit and is independent of the inductance thereby permitting tuning of the circuits over a range of frequencies without affecting the width of the band of frequencies passed by the tuned circuits. Such circuits involve a large number of individual elements as well as requiring a large number of switching contacts.

In one of its aspects the present invention is directed to considerably reducing the number of elements required in tuned circuits of the character described as well as simplifying the operation thereof while at the same time providing the desired constant bandwidth over the frequency ranges of operation thereof.

It has been proposed to use series resonant circuits as the tuning element in receivers as in series resonant circuits the bandwidth is a function of the resistance and inductance of the circuit and is independent of the capacitance. In such a circuit the pass band of the circuit is a function of the resistance and inductance of the circuit. The resistance is determined by the impedance of the source of signal and in conventional practice such impedance is the 75 ohm impedance of the transmission line used for transmission of the signal from an antenna to the tuned circuit and is considered to be fixed. The inductive reactance must be sufficiently high to provide the necessary Q for the circuit. For example, at 213 megacycles, the center frequency of channel 13, with a source impedance of 75 ohms, and a Q of 25.1 to provide a pass band of 8.5 megacycles in a single tuned circuit, and inductance of 1.4 microhenries is required and correspondingly with such an inductance a tuning capacitance of 0.396 picofarad is required. Such an inductance is difficult to achieve in view of the resonant effects therein due to the existence of distributed stray capacitance in the inductance. Also, a variable tuning capacitance with such a small minimum capacitance is considerably below the limits of practically available variable capacitor gangs.

A transformer to transform the 75 ohm impedance of the transmission line to a much lower value, for example 7.5 ohms, would enable smaller inductances, free of pronounced self-resonance effects to be used. Additionally, the minimum capacitance required for tuning would become feasible. However, a transformer of tightly coupled primary and secondary windings providing a 10:1 transformation over the 54–216 mHz. range is difficult to achieve especially since core materials necessary to achieve the coupling tend to be quite lossy at the higher frequencies.

In another one of its aspects, the present invention is directed to overcoming such limitations in capacitance tuned circuits for providing constant bandwidth.

In another one of its aspects, the present invention is directed to simple provisions in parallel resonant circuits for enabling such circuits as well to be capacitively tuned and yet provide constant bandwidth over the tuning range thereof.

In a further one of its aspects the present invention is directed to a simple, continuously tuneable circuit having substantially constant bandwidth over broad ranges of frequencies yet which has a minimum number of impedance elements and switch elements and which is easily fabricated and of low cost.

In accordance with an illustrative embodiment of the present invention as applied to television receiver circuits there is provided a capacitance tuned circuit in which the capacitance is varied from a low value corresponding to resonance at the high end of the upper range to a large value of capacitance corresponding to resonance at the lower end of the low range. For achieving constant bandwidth characteristics for the low range a series resonant circuit is utilized. For achieving constant bandwidth for the upper range a parallel resonant circuit is utilized. The conversion of the series resonant circuit to a parallel resonant circuit is effected by switching an inductance in shunt with the tuning capacitance over the high range of frequencies.

The low resistance in the series resonant circuit to obtain the desired Q at the upper end of the lower range is achieved by paralleling an impedance transforming inductance with the signal source. Such a parallel circuit when converted into an equivalent series circuit provides an equivalent series resistance which is considerably smaller than the source resistance, as desired. The impedance of the impedance transforming inductance decreases with frequency. Accordingly, at the lower end of the lower range the equivalent resistance is reduced. To raise the value of such resistance to the same value as at the upper end of the lower range of frequencies an impedance transforming network is connected in shunt with the source. In one form such impedance transforming network may be a series circuit of capacitance and inductance, i.e., a high pass filter type circuit in relation to the lower end of the range of frequencies. Such network serves to raise the equivalent series resistance over the low end of the lower range to the desired constant value thereby maintaining bandwidth constant. As the reactance of such capacitance becomes small and the reactance of the inductance becomes large at the upper end thereof of the lower range and over the high range of VHF frequencies such network has minimal effect on circuit operation at such frequencies.

The equivalent series resistance and reactance of the impedance transforming network over the high range of frequencies is considerably higher than the equivalent series resistance and reactance over the low range and increases with frequency. In the high range of frequencies such equivalent resistance and reactance are in series with the principal inductance of the series tuned circuit and forms a branch of a parallel resonant circuit. Accordingly, the Q of the parallel resonant circuit also increases, but tends to remain nearly constant over the high frequency range. To provide sharper increase of Q with frequency over the upper range, the principal inductance of the series tuned circuit may be shunted by a capacitance of a value such that the parallel resonant frequency of such combination is higher than the frequencies of the upper range but sufficiently close thereto so that at the upper end of the upper range, the apparent inductance of such combination is higher than it is at the lower end of said range. With such a provision the equivalent parallel resistance of the parallel resonant circuit is greater at the upper end of the range than it is at the lower end of the range thereby resulting in a more pronounced increase of Q with increasing frequency to enable more precise maintenance of constant bandwidth as frequency is increased.

The novel features believed characteristic of the invention are set forth in the appended claims. The invention itself, together with further objects and advantages thereof may best be understood by reference to the following description taken in connection with the accompanying drawings in which:

Figure 3:
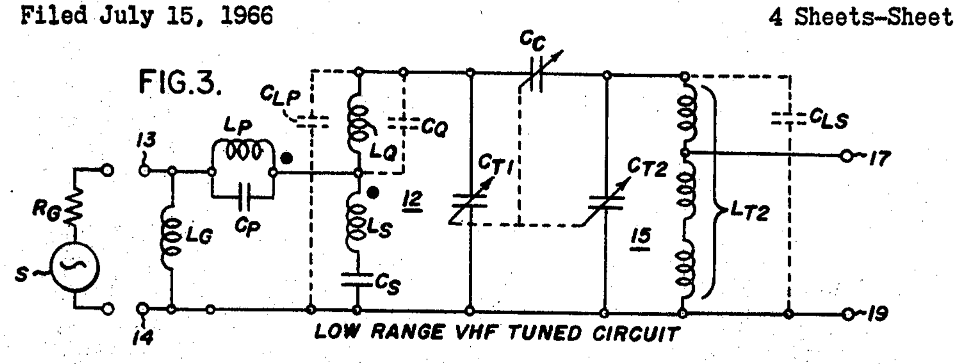
FIGURE 3 shows a schematic diagram of the primary and secondary tuned circuits of the embodiment of FIGURE 1 utilized for channels 2 through 6 of the VHF range.
Figure 5A:
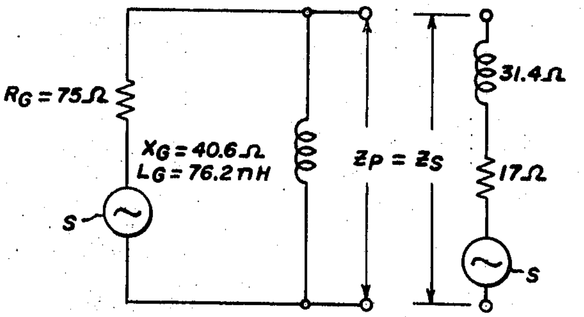
Figure 5B:
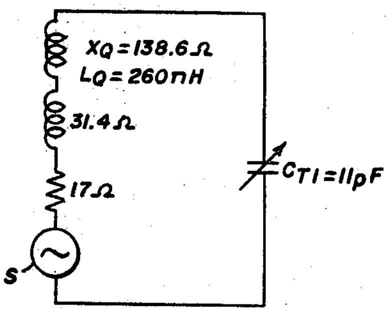

FIGURES 5A and 5B shown diagrams of circuits useful in explaining the operation of the primary tuned circuit of FIGURE 3 on channel 6 operation.

FIGURES 6A, 6B and 6C show diagrams of circuits useful in explaining the operation of the primary tuned circuit of FIGURE 3 on channel 2 operation.

Figure 4:
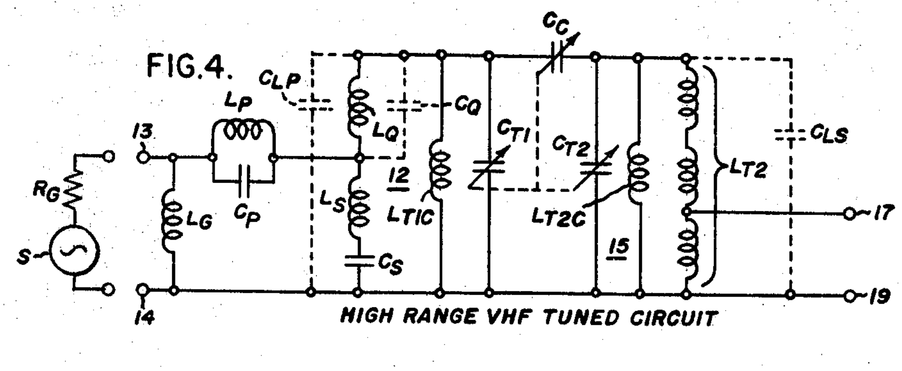
FIGURE 4 shows a schematic diagram of the primary and secondary tuned circuits of the embodiment of FIGURE 1 for channels 7 through 13 of the VHF range.

FIGURES 7A and 7B show diagrams of circuits useful in explaining the operation of the primary tuned circuit of FIGURE 4 on channel 13 operation.

FIGURES 8A and 8B show diagrams of circuits useful in explaining the operation of the primary tuned circuit of FIGURE 4 on channel 7 operation.

Figure 1:
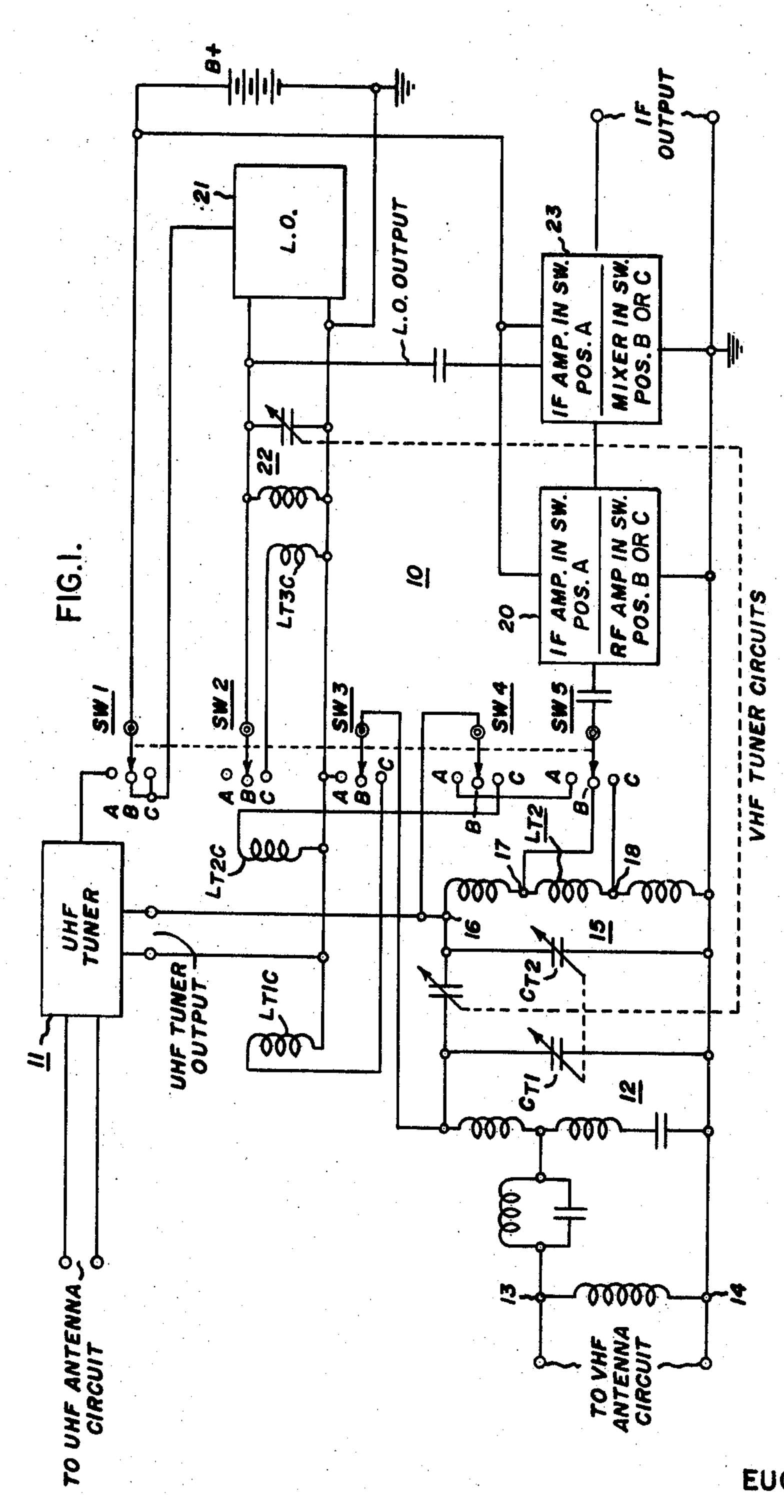
FIGURE 1 shows a drawing partly in schematic form and partly in block form of the tuner portion of a television receiver incorporating an embodiment of the present invention.

Referring now to FIGURE 1 there is shown that portion of a television receiver circuit which is commonly referred to as the "head end" or radio frequency (RF) end and consists of a VHF tuner 10 and a UHF tuner 11. The VHF tuner 10 functions to select the television signal in the particular channel in the VHF range of transmission for subsequent conversion into a television picture. The UHF tuner 11 functions to select the television signal in the particular channel of UHF range of transmission for subsequent conversion into a corresponding television picture. The VHF portion of the circuit includes a primary tuned circuit 12 including input terminals 13 and 14, a secondary tuned circuit 15 coupled to the primary tuned circuit 12 and including output terminals 16, 17, 18, and RF amplifier 20, a local oscillator 21 including a tuned circuit 22, and a mixer 23. The VHF television signals received by an antenna (not shown) are supplied by a transmission line (not shown) to the input terminals 13 and 14 of the primary tuned circuit. The primary and secondary tuned circuits serve to pass the desired band of frequencies and reject all other frequencies. The desired band of frequencies appearing at the output terminals of the secondary tuned circuit are applied to an RF amplifier 20. The mixer 23 in conjunction with the local oscillator 21 converts the RF signal from the output of the RF amplifier into intermediate frequency (I.F.) signals for application to the I.F. amplifier circuits of the television receiver.

Figure 2:
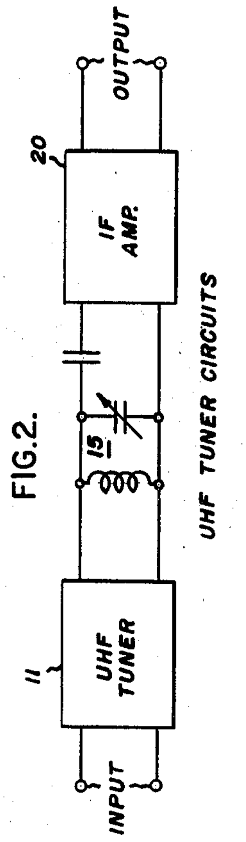
FIGURE 2 shows the portion of the tuned circuits of FIGURE 1 utilized in the UHF mode of operation of the tuner.

The UHF portion of the head end, more particularly shown in FIGURE 2, consists of a UHF tuner 11 connected to the secondary tuned circuit 15 in such manner that its inductance serves as a D.C. ground return path for the mixer diode in the UHF tuner, and further is connected to amplifier 20, 23, for application to the I.F. amplifier circuits of the television receiver. Television signals received at the UHF antenna (not shown) are supplied by a transmission line (not shown) to the input terminals of the tuner 11. The I.F. signals appearing at the output of the tuner are applied to the I.F. amplifier 20, 23 which includes the tuned circuit 15 as part of the input circuit thereof. Due to the very low Q of this tuned circuit in this mode of operation, considerable latitude exists in the choice of L and C values. The signals amplified by the I.F. amplifier are applied through the mixer to the other I.F. circuits of the television receiver.

A bank of five mechanically ganged three-position switches SW1 through SW5 function to make appropriate circuit connection in the head end of the receiver or composite tuner for operation of the composite tuner in the UHF range, the low portion of the VHF range and the high portion of the VHF range of television transmission frequencies. Switch positions A, B and C of the bank of switches SW1 through SW5 correspond, respectively, to UHF channel operation, low range VHF operation and high range VHF operation. Switch SW1 supplies energizing potential to the UHF tuner in position A and supplies energizing potential to the local oscillator 21 in positions B and C. Switch SW2 functions in position C to connect a tuning inductance $L_{TC3}$ in parallel with the tuned circuit 22 of the local oscillator 21. Switch SW3 functions in position A to short out the primary tuned circuit 12 to ground and in position C functions to connect a tuning inductance $L_{T1C}$ in shunt with the primary tuning capacitance $C_{T1}$ to convert it into a parallel tuned primary circuit. SW4 functions in position A to connect the secondary tuned circuit 15, adapted to serve as a D.C. ground return path for the UHF mixer diode, to switch position A on switch SW5 which in turn connects the circuit 15 to the I.F. amplifier 20. Switch SW4 in switch position C functions to connect a tuning inductance $L_{T2}$ in parallel with secondary tuning capacitance. Switch SW5 in position B functions to connect the output appearing across inductance $L_{T2}$ at an appropriate impedance point to the RF amplifier 20 to provide good impedance match at low range VHF operation. Switch SW5 in position C connects the output appearing across the inductance $L_{T2}$ to the RF amplifier 20 to provide good impedance match in the upper range of VHF operation.

FIGURE 3 shows the frequency selective or tuned circuit of FIGURE 1 for low range VHF operation. The circuit comprises a series tuned primary circuit including essentially a variable capacitor $C_{T1}$, an inductor $L_Q$, a series tuned secondary circuit including essentially a variable capacitor $C_{T2}$ and inductance $L_{T2}$. The primary tuned circuit is coupled to the secondary tuned circuit through variable capacitor $C_C$. Signals from a source S (an antenna and transmission line), for example, with internal impedance $R_G$ are connected to the input terminals 13 and 14 of the tuned circuit. An impedance transforming inductor $L_G$ is connected across the input terminals to convert the internal resistive impedance $R_G$ of the source S to an appropriate equivalent series resistance. The parallel combination of internal impedance $R_G$ and inductance $L_G$ provides an equivalent series impedance having the desired resistance which in conjunction with the inductance $L_Q$ provides the desired bandwidth for channel 6 operation. The equivalent series reactance of such a parallel network is not an appreciable part of the total series inductive reactance.

Another network consisting of parallel resonant filter circuit of capacitor $C_P$ and inductor $L_P$ connected in series with a series resonant filter circuit of capacitor $C_S$ and the inductor $L_S$ is connected across the input terminals 13 and 14. This composite network is connected at the junction of the series $L_SC_S$ and parallel $L_PC_P$ filter circuits to the inductor $L_Q$ and variable capacitor $C_{T1}$ which are connected in series circuit. The composite network $C_PL_P$, $C_SL_S$ functions as an I.F. filter over the band of frequencies nominally from 41 through 46 megacycles. The parallel resonant circuit $L_P$, $C_P$ is tuned to 41 megacycles and the series resonant circuit $L_S$, $C_S$ is tuned to 46 megacycles. The inductors $L_P$ and $L_S$, the ends thereof have like polarity being indicated by a dot, are mutually coupled to provide the desired form of the band rejection characteristic in the range of 41 to 46 megacycles. Such network is more fully described and claimed in my copending patent application Ser. No. 452,498, filed May 3, 1965 and now U.S. Patent No. 3,396,341 issued Aug. 6, 1968 and assigned to the assignee of the present invention. In addition, such circuit provides at channel 2 operation an impedance which boosts the low value of the equivalent series resistive impedance of a circuit consisting of internal source impedance $R_G$ and the impedance transforming inductance $L_G$. At channel 2 operation, the parallel resonant circuit becomes capacitive and the series resonant circuit becomes inductive. The values of such capacitive and inductive reactance are determined so as to provide the desired equivalent series resistance for the series resonant circuit, i.e., the same value as for channel 6 operation. In effect the parallel resonant circuit and series resonant circuit are impedance transforming elements for performing the functions indicated at the low end of the low range of VHF operation in addition to their I.F. filter function. At the high end of the low range of operation effectively the parallel resonant circuit has low capacitive reactance and the series circuit has a relatively high inductive reactance and is not significant in such frequencies.

The primary and secondary capacitors $C_{T1}$ and $C_{T2}$ are mechanically ganged and are concurrently varied to tune the primary circuit and the secondary circuits. The coupling capacitor $C_C$ is also mechanically ganged to capacitors $C_{T1}$ and $C_{T2}$ and varied concurrently to provide essentially critical coupling over the range of operation of the circuit for reasons which will be more fully described below. The output across the secondary inductance $L_{T2}$ is taken from the intermediate point 17 of inductance $L_{T2}$ to provide a good impedance match to the input circuit of the RF amplifier to which the output terminals 17, 19 are connected. Capacitance $C_Q$ appearing in shunt with $L_Q$ and indicated by dotted lines is the distributed capacitance across the inductor $L_Q$. Such distributed capacitance is small and not significant on low range VHF operation. However, it can be used advantageously over the high range VHF operation to improve the performance of the circuit in a manner that will be more fully described below. The capacitors $C_{LP}$ and $C_{LS}$ indicated by dotted lines across the inductor $L_{T1}$ and $L_{T2}$ represent the total added stray capacity of the circuits. Allowance must be made for any such capacitance in the design. The secondary parallel resonant circuit is arranged so that it has a sufficiently high Q on channel 6 to provide the desired band pass. More particularly, the Q is arranged to be approximately equal to the Q of the primary circuit.

Referring now to FIGURE 4 there is shown the tuned circuits of FIGURE 1 for high range VHF operation. The elements of the circuit of FIGURE 4 corresponding to elements of the circuit of FIGURE 3 are designated by the same symbols. In addition to the elements common with elements of the circuit of FIGURE 3, two elements are provided. Inductor $L_{T1C}$ is connected in shunt with the variable capacitor $C_{T1}$ to convert the primary circuit from a series to a parallel tuned circuit. Inductor $L_{T2C}$ is connected in shunt with the variable capacitor $C_{T2}$ to permit tuning of the secondary circuit to the higher frequencies of the high range. As the combination I.F. filter and impedance matching network consisting of parallel resonant circuit $L_P$, $C_P$ and series resonance circuit $L_S$, $C_S$ is in essence a high pass filter, such a network has no appreciable effect on the overall operation of the primary and secondary circuits over the high range. The transforming impedance $L_G$ increases with frequency. Accordingly, the equivalent series resistance and reactance of the combination of $R_G$ and $L_G$ increase with frequency. Such equivalent series resistance and reactance in series with inductance $L_Q$ can be transformed into an equivalent parallel resistance and reactance connected in parallel with $C_{T1}$ and $L_{T1C}$. To produce the desired variation of Q over the high range the capacitance $C_Q$ in shunt with $L_Q$ may be increased in value so as to provide another parallel resonant circuit tuned to a resonant frequency above the frequency of the high range yet sufficiently close thereto such that the equivalent impedance of said another parallel resonant circuit increases with frequency. The effective parallel resistance of the primary parallel resonant circuit will then increase with frequency. The operator of the tuned circuits of FIGURES 3 and 4 will be more readily understood and appreciated by exemplary design procedures described in connection with FIGURES 5A, 5B, 6A, 6B, 6C, 7A, 7B, 8A and 8B. Consider a circuit consisting of inductance L and capacitance C and resistance R all connected in parallel. The following equations represent the manner in which the Q and Bandwidth (B.W.) of such a circuit varies with the parameters of the circuit and frequency:

$$Q=\frac{R}{X}=\frac{R}{2\pi L}\times\frac{1}{f_0}=2\pi RC\times f_0 \qquad (1)$$

$$BW=\frac{f_0}{Q}=\frac{f_0}{\frac{R}{2\pi L\times f_0}}=\frac{2\pi L f_0^2}{R} \qquad (2)$$

$$BW=\frac{f_0}{Q}=\frac{f_0}{2\pi RC\times f_0}=\frac{1}{2\pi RC} \qquad (3)$$

Where $f_0$ is resonant frequency and X is reactance. Consider another circuit consisting of an inductance L, a capacitance C and resistance R connected in series. The following equations represent the manner in which the Q and bandwidth B.W. of such circuit vary with the parameters of the circuit and frequency:

$$Q=\frac{X}{R}=\frac{2\pi L}{R}\times f_0=\frac{1}{2\pi RC}\times\frac{1}{f_0} \quad (4)$$

$$BW=\frac{f_0}{Q}=2\pi RC\times f_0^2 \quad (5)$$

$$BW\frac{R}{2\pi L} \quad (6)$$

Equation 2 indicates that for a parallel tuned circuit with fixed resistance and inductance, i.e., with capacitance tuning, bandwidth varies with resonant or center frequency squared. Equation 3 indicates that for fixed capacitance and resistance (i.e., inductive tuning) bandwidth is fixed and independent of frequency. Equation 5 indicates that for a series tuned circuit with fixed resistance and capacitance bandwidth varies as center frequency squared. Equation 6 indicates that for a series circuit with fixed inductance and resistance (capacitive tuning), bandwidth is independent of frequency.

It is apparent from practical considerations that to provide a continuously tuneable resonant circuit of constant bandwidth tuneable over a broad range or ranges of frequencies that the variable element should be capacitance as variable inductances are difficult to make and are expensive. With capacitance being the variable element it is apparent that some form of series resonant circuit should be used to provide constant bandwidth over the range or ranges of frequency or some form of parallel resonant circuit appropriately compensated for frequency. In accordance with the present invention both of the above indicated approaches are used to provide a continuously capacitive tuneable circuit for selecting a constant bandwidth of frequencies for passage therethrough over the lower and upper ranges of the VHF band. A series tuned primary circuit modified in a manner to be described is provided for the low range of the VHF bands and a parallel tuned primary circuit which is modified in the manner to be described is provided for the high range of the VHF bands. A parallel resonant, capacitively tuneable circuit varies in bandwidth as frequency squared. However, the percentage change in frequency from the low end to the high end of high range VHF is not appreciable. Accordingly, the bandwidth variation over the high range would not be nearly as great as for the low range. In addition, in accordance with the circuit of the invention impedance elements are introduced in the operation of the circuit over the higher range which counteract such variation for parallel resonant circuits.

The limiting factors in the design of a tuneable circuit, capactively tuneable over the entire VHF range, is determined by (1) the internal impedance of generator, (2) the bandwidth desired, and (3) the minimum practical capacitance available at channel 13 operation. As all of these factors are for a particular structure what modifications are necessary in the basic approach for low range and high range operation outlined above will now be determined.

Consider the circuit of FIGURE 3 which is supplied by signal from a generator having internal impedance of 75 ohms. Assume that the secondary circuit is critically coupled to the primary circuit, and that a bandwidth of 12 megacycles is required in the double tuned circuit. Assume that the Q's of the primary and secondary circuit are equal. The primary circuit bandwidth would then be 8.5 megacycles, i.e., $1/\sqrt{2}$ or 0.707 times 12. The Q's for the various low and high range channels can be determined from the relationship $Q=f_0/BW$ and are indicated in Table 1 below. Minimum tuneable capacitance is assumed to be 7 picofarads and would correspond to the capacitance at center frequency of channel 13 or 213 megacycles. Accordingly, the capacitance at channel 7 would then be 10.15 picofarads as the capacitance varies as the inverse square of resonant frequency. The value of capacitance at channel 6 is set at 11 picofarads, i.e., slightly higher than capacitance at channel 7. Accordingly, the capacitance of the center frequency of channel 2 would be 24.5 picofarads. The above capacitance values and the capacitance values for the other channels are set forth in Table 1 to which reference is now made.

TABLE 1

| VHF channel | Center freq. $f_0$ | $f_6/f$ | $(f_6/f_2)$ | $C_{TI}$ (pf) | C Gang (pf) | Desired Q or $f_0$/8.5 mc. | $C_C$ or $C_{TI}$/Q (pf) |
|---|---|---|---|---|---|---|---|
| 2 | 57 | 1.49 | 2.2225 | 24.5 | 20.5 | 6.7 | 3.7 |
| 3 | 63 | 1.35 | 1.825 | 20.1 | 16.1 | 7.4 | 2.77 |
| 4 | 69 | 1.232 | 1.52 | 16.7 | 12.7 | 8.1 | 2.1 |
| 5 | 79 | 1.075 | 1.157 | 12.7 | 8.7 | 9.3 | 1.4 |
| 6 | 85 | 1 | 1 | 11.0 | 7 | 10 | 1.1 |
| | | $f_{13}/f$ | | | | | |
| 7 | 177 | 1.293 | 1.450 | 10.15 | 6.2 | 20.8 | 0.49 |
| 8 | 183 | 1.164 | 1.358 | 9.5 | 5.5 | 21.5 | 0.44 |
| 9 | 189 | 1.126 | 1.270 | 8.9 | 4.9 | 22.2 | 0.40 |
| 10 | 195 | 1.092 | 1.192 | 8.35 | 4.4 | 23 | 0.36 |
| 11 | 201 | 1.059 | 1.123 | 7.87 | 3.9 | 23.6 | 0.33 |
| 12 | 207 | 1.028 | 1.058 | 7.4 | 3.4 | 24.4 | 0.30 |
| 13 | 213 | 1 | 1 | 7 | 3 | 25.1 | 0.28 |

The first column sets forth various VHF channels. The second column sets forth the center frequency $f_0$ of such VHF channels. The third column sets forth the ratio of frequency of channel 6, $f_6$, to the center frequency of the particular channel for the lower portion of the VHF band, i.e., channels 2 through 6, and similarly for channels 7 through 13 the third column sets forth the ratio of the frequency at channel 13, $f_{13}$, in relation to the value at the particular channel. The fourth column sets forth the square of the ratios in the third column used for the purpose of calculating $C_{T1}$ for the various channels. The fifth column sets forth the tuning capacitance ($C_{T1}$) requirements for each of the channels. The sixth column sets forth the tuning capacitance less an assumed stray capacitance of 4 picofarads. The seventh column sets forth the Q required at the various channels to provide a primary bandwidth of 8.5 megacycles, determined as mentioned above. The eighth column sets forth the coupling capacitance $C_C$ required to provide critical coupling of the secondary tuned circuit to the primary tuned circuit. The coupling capacitance for each of the channels for critical coupling is determined from the relationships:

Critical $K=1/Q$, assuming primary and secondary Q's are equal

Critical $K=C_C/C_{T1}$, or $C_C=C_{T1}/Q$.

The following relationships for converting parallel impedances to equivalent series impedances (Equations 7 and 8) and to convert series impedance to equivalent parallel impedances (Equations 9 and 10) are set forth as they are used in arriving at the circuit values for the tuned circuits of FIGURES 3 and 4:

$$R_S=\frac{X_P^2R_P}{R_P^2+X_P^2} \quad (7)$$

$$X_S=\frac{R_P^2X_P}{R_P^2+X_P^2} \quad (8)$$

$$R_P=\frac{X_S^2}{R_S}+R_S \quad (9)$$

$$X_P=\frac{R_S^2}{X_S}+X_S \quad (10)$$

Where $R_S$=series resistance,
$X_S$=series reactance,
$R_P$=parallel resistance, and
$X_P$=parallel reactance.

Referring now to FIGURE 5A there is shown a parallel circuit consisting of a resistance representing the internal resistance $R_G$ of the generator S and an impedance representing the impedance of the inductance $L_C$ and the equivalent series circuit thereof on channel 6 operation. $Z_P$ represents the impedance of the parallel circuit and $Z_S$ represents the impedance of the series circuit. The value of the inductance $L_C$ is determined first, the equivalent series resistance $R_S$ which will produce the desired bandwidth in channel 6 is determined by the following equation:

$$R_S=\frac{1}{\omega C_6}\times Q_6 \quad (11)$$

From Table 1 Q is equal to 10 and C is equal to 11 picofarads and $\omega=2\pi\times85$ mc. Accordingly, the desired equivalent series resistance is 17 ohms. The internal resistance of the source $R_G$ is 75 ohms. Using Equation 9 which expresses the parallel resistance in terms of the series resistance and reactance, the equivalent series reactance can be readily calculated and is 31.4 ohms. Using Equation 10 which expresses parallel reactance in terms of the series resistance and the series reactance, the reactance of $L_G$ is determined to be 40.6 ohms. Accordingly, inductance $L_G$ is equal to 76.2 nanohenries.

The value of $L_Q$ of FIGURE 3 is determined as follows: The tuning reactance of the series resonant circuit$=Q\times R$, or 170 ohms. The reactance of $L_Q$ is equal to the tuning reactance (170 ohms) minus the equivalent series reactance (31.4 ohms) or 138.6 ohms. Accordingly, $L_Q$ is equal to 260 nanohenries. The resultant primary series circuit resonant at $f_o$=85 megacycles is shown in FIGURE 5B.

Referring now to FIGURE 6A there is shown the equivalent series circuit of the parallel circuit shown in FIGURE 5A when operated at the center frequency of channel 2 to which has been connected a capacitance having reactance $X_F$ and an inductance having reactance $X_L$ in series to provide a parallel circuit. There is also shown the equivalent series circuit of such a parallel circuit. It should be noted that the inductance $L_G$ at the center frequency of channel 2 has a lower impedance than it had at the center frequency of channel 6. Accordingly, the equivalent series resistance and series reactance are lower than at channel 6. In order to provide the same bandwidth as at channel 6, the equivalent series resistance of the circuit must be the same, i.e., 17 ohms. Accordingly, the I.F. filter network which at channel 2 consists of equivalent reactances $X_F$ and $X_L$ is utilized through proper choice of values to transform the resistive imepdance of 8 ohms to the required 17 ohms for channel 2 operation.

A suitable value of capacitance for the filter $L_PC_P$ may be assumed, for example 150 picofarads. This will appear as 38.6 ohms capacitive reactance at 57 megacycles to provide reactance $X_F$. Considerable leeway is possible in choice of this reactance. The series circuit consisting of resistance of 8 ohms, inductive reactance of 24.1 ohms and capacitive reactance of 38.6 is transformed into its equivalent parallel circuit. The calculation results in a parallel resistance of 32.7 ohms and a capacitive reactance of 19.8 ohms. The magnitude of the inductive reactance $X_L$ must now be calculated such that it forms, with the 19.8Ω shunt capacitive reactance, the reactance necessary to transform the 32.7 ohm resistance to the equivalent 17 ohms series resistance required. Using Equation 9 which expresses parallel resistance in terms of series reactance and resistance the series reactance is calculated to be 16.33 ohms. From Equation 10 the parallel reactance is readily determined and in turn the reactance $X_L$ as a part of the total parallel reactance is determined as 47.3 ohms. FIGURE 6B shows the resultant primary series circuit resonant at 57 megacycles.

The reactance $X_L$ can be realized in various ways, one of which is by a simple inductance of suitable value. Another way would be by use of a series tuned circuit tuned to resonance below 57 megacycles. Similarly the capacitive reactance $X_C$ may be obtained by means of a parallel resonant circuit tuned to resonate below 57 megacycles.

A circuit with such elements is shown in FIGURE 6C to which reference is now made. The parallel resonant circuit has a capacitance $C_P$ and an inductance $L_P$ which resonate at 41 megacycles and the series resonant circuit has a capacitance $C_S$ and an inductance $L_S$ which resonates at 46 megacycles. The inductive elements, the like polarity ends of which are indicated by dots adjacent such ends of the parallel resonant and series resonant circuit, are mutually coupled in magnetically aiding relationship. Such a circuit provides a rejection of frequencies in the band of 41 through 46 megacycles as well as provides an equivalent series capacitance and shunt inductance at 57 megacycles to effect the desire impedance transformation as pointed out above. The coupling between the inductors $L_P$ and $L_S$ can be varied to control the bandwidth and flatness of the filter. My aforementioned patent application Ser. No. 452,498 now U.S. Patent No. 3,396,-341 describes the combination filter and impedance matching or transforming element in detail and sets forth formulas for determining $C_P$ in terms of $C_F$, where $C_F$ is capacitance which has reactance $X_F$ at 57 megacycles, and for determining $L_S$ in terms of $L_L$, where $L_L$ is the inductance which has reactance $X_L$ at 57 megacycles. Such relationships are $$C_P=\frac{aC_F}{a-\frac{1}{a}}$$

and $$L_S=\frac{b}{\left(\frac{1}{b-b}\right)}L_L$$

where $$a=\frac{57\text{ mc.}}{41\text{ mc.}}=1.39$$

and $$b=\frac{57}{46}=1.24$$

Referring now to FIGURE 7A there is shown a series circuit consisting of (1) the equivalent series impedance at 213 megacycles of the internal impedance $R_G$ of the generator S in parallel with $L_G$ and (2) impedance of inductance $L_Q$. As the reactance of $L_G$ at 213 megacycles is considerably greater than it is at 85 megacycles the resultant equivalent series resistance and reactance are larger than at 85 megacycles. Such value may be readily determined by Equations 7 and 8. The impedance $Z_S$ of the series circuit transforms into the equivalent parallel impedance $Z_P$ shown. As the capacitance at channel 13 is known, the capacitive reactance at that frequency is readily determined. As equivalent parallel impedance $Z_P$ of the series circuit is known, the required additional parallel reactance required can be readily determined and the value is 150 ohms corresponding to an inductance of 104 nanohenries as indicated.

FIGURE 7B shows the resultant primary parallel circuit resonant at 213 megacycles. The Q at channel 13 is determined by dividing the parallel resistance of 3080 ohms by the resonant reactance of 106.5 ohms and is 28.9.

Referring now to FIGURE 8A there is shown a series circuit consisting of (1) the equivalent series impedance at 177 megacycles of the parallel combination of the internal impedance $R_G$ of the generator S and the impedance transforming inductance $L_G$, and (2) the reactance of tuning inductance $L_Q$. The equivalent series impedance of $R_G$ and $L_G$ in parallel at 177 megacycles transforms to a series resistance of 42 ohms and a series reactance of 37.2 ohms. The impedance of the complete series circuit $Z_S$ transforms to equivalent parallel impedance $Z_P$ composed of a resistance of 2592 ohms and a reactance of 332.4 ohms. FIGURE 8B shows the resultant primary parallel circuit resonant at 177 megacycles. The Q of such circuit is equal to the parallel resistance divided by the resonant reactance and calculates to be 29.

The values of the various elements of the circuit of FIGURES 3 and 4 calculated as set forth in FIGURES 5A, 5B, 6A, 6B, 6C, 7A, 7B, 8A, and 8B with resultant Q's are set forth in Table 2 below:

TABLE 2

| | | |
|---|---|---|
| $L_G$ | nh | 76.2 |
| $C_P$ | pf | 150 |
| $C_S$ | pf | 31.4 |
| $L_Q$ | nh | 260 |
| $Q_2$ | | 6.7 |
| $Q_6$ | | 10 |
| $Q_7$ | | 29 |
| $Q_{13}$ | | 28.9 |

It was assumed that $C_Q$ was negligible. As the stray capacitance across inductance $L_Q$ is significant in the upper portion of the VHF band such has to be taken into account. Table 3 shows the calculated value of Q when various such capacitances are taken into account.

TABLE 3

| $L_G$ (nh) | $C_P$ (pf) | $C_S$ (pf) | $L_Q$ (nh) | $C_Q$ (pf) | $Q_2$ | $Q_6$ | $Q_7$ | $Q_{13}$ |
|---|---|---|---|---|---|---|---|---|
| 7.62 | 150 | 31.4 | 260 | 0.1 | 6.7 | 9.9 | 31.4 | 32.4 |
| | | | | 0.3 | | | 35.4 | 39.07 |
| | | | | 0.5 | | | 40.5 | 48.02 |

From Tables 2 and 3 it should be noted that as the coil $L_Q$ stray capacitance $C_Q$ is increased not only does the Q of channels 7 and 13 increase but the spread of Q between these channels also increases. The reason for such results lies in the nature of parallel resonant circuits. In a parallel resonant circuit the impedance thereof below the resonant frequency is an inductance and above is a capacitance. The impedance of the parallel resonant circuit below resonance increases with frequency at an increasing rate as the resonant frequency is approached. Accordingly, it is apparent that as the stray capacitance is increased the parallel resonant frequency of $L_Q$ and $C_Q$ decreases, in effect bringing the frequency of channels 7 and 13 up on the impedance curve of the parallel resonant circuit thereby producing not only an ultimately higher value of Q for the resultant parallel circuit as represented in FIGURES 7B and 8B but also producing an increasing spread in the Q's of the resultant circuit.

From Table 2 it should be noted that the desired Q for channel 13 is 25.1 and for channel 7 is 20.8 while the calculated values are 28.9 and 27, respectively. The former values can be achieved reasonably closely by a procedure such as the following which can be achieved by using a $C_Q$ capacitance of a particular value and reducing the value of channel 13 tuning capacitance $C_{T1}$ sufficiently to produce the desired value of Q at channel 13. For example assume a capacitance $C_Q$ of 0.3 pf. As the Q of the parallel resonant circuit varies directly as resistance, frequency and capacitancce channel 13 tuning capacitance would be changed by a factor of the ratio of the desired Q to the calculated Q of the parallel resonant circuit corresponding to $C_Q$ of 0.3, i.e., $$\frac{25.1}{39.1}\times 7 \text{ or } 4.5 \text{ picofarads}$$

Channel 7 capacitance would then be 6.2 picofarads and the capacitance of the other high range channels would be changed accordingly.

The foregoing is a description of an illustrative embodiment of the invention, and it is applicant's intention in the appended claims to cover all forms which fall within the scope of the invention.

What I claim as new and desire to secure by Letters Patent of the United States is:

1. A tuned circuit for passing a band of frequencies substantially constant in width over a first range of frequencies and over a second range of frequencies substantially higher in value than said first range of frequencies comprising:

a first inductor and a first variable capacitor resonant therewith over said first range of frequencies, a source of signals extending over said ranges of frequencies, said first inductor, said first capacitor and said source being connected in series circuit whereby as the capacitance of said first capacitor is decreased in value the resonant frequency of said series resonant circuit is increased and the bandwidth thereof remains substantially constant over said first range of frequencies, and means for switching a second inductor in shunt with said first capacitor to provide a parallel resonant circuit including said first capacitor, the inductance of said second inductor being of value to provide parallel resonance at the low end of said second range of frequencies with a value of capacitance of said first capacitor lower than the value of capacitance providing resonance at the upper end of said first range of frequencies whereby as the capacitance of said first capacitor is decreased in value the resonant frequency of said parallel resonant circuit is increased and the bandwidth thereof remains substantially constant.

2. The invention of claim 1 further including:

said source having internal resistive impedance, and an impedance transforming network connected in shunt with said source and having output terminals connected in series with said first inductor to provide a relatively constant resistive impedance and a small reactive component in relation to the reactance of said first inductor, whereby as the resonant frequency of said series circuit is varied over said first range of frequencies by varying the capacitance of said first capacitor the bandwidth thereof remains substantially constant, said impedance transforming network providing higher equivalent series resistance at the output terminals thereof over said second range of frequencies than the resistive impedance and reactive component provided over said first range of frequencies whereby as the resonant frequency of said parallel resonant circuit increases the bandwidth thereof remains substantially constant over said second range of frequencies.

3. The invention of claim 1 further including:

a third inductor and a second variable capacitor connected in series to provide a second series resonant circuit, the capacitance of said second capacitor being variable to tune said third inductor and said second capacitor to series resonance over said first range of frequencies, a fourth inductor, means for connecting said fourth inductor in parallel with said second capacitor to provide a second parallel resonant circuit, resonant over said second range of frequencies, the Q of said first series resonant circuit being set to substantially equal the Q of the second series resonant circuit over the first range of frequencies and the Q of said first parallel resonant circuit being set to equal the Q of said second parallel resonant circuit over said second range of frequencies, a third variable capacitor for substantially critically coupling said primary and said secondary resonant circuits over said ranges of frequencies, and means for jointly varying said variable capacitors to tune said resonant circuits over said first and second ranges of frequencies and provide substantially critical coupling thereover.

4. A tuned circuit for passing a predetermined band of frequencies over a range of frequencies comprising:

a first inductor and a first variable capacitor resonant therewith over said range of frequencies, a source of signals extending over said range of frequencies, said source having internal resistive impedance, said first inductor, said first capacitor and said source being connected in series circuit, whereby a series resonant circuit is formed tuneable over said range of frequencies by said first capacitor, a second inductor in shunt with said source, a high pass filter including a second capacitor and a third inductor in series connected in shunt with said source, said second capacitor providing relatively low impedance and said second inductor providing a relatively high impedance in relation to the impedance of said first inductor at the high end of said range of frequencies, and second inductor having a value to transform said internal impedance of said source to equivalent series values of resistance and reactance to provide a predetermined bandwidth at resonance at the high end of said range of frequencies, said equivalent value of resistance being substantially smaller than said internal impedance, and said equivalent value of reactance being substantially smaller than the reactance of said first inductor, said second capacitor and said third inductor having values at the low end of said range of frequencies to provide a substantially identical value of equivalent resistance in series with said first inductor whereby said predetermined bandwidth at resonance is provided at the low end of said range of frequencies.

5. A tuned circuit for passing a predetermined band of frequencies over a range of frequencies comprising:

a first inductor and a first variable capacitor resonant therewith over said range of frequencies, a source of signals extending over said range of frequencies, said source having internal resistive impedance, a first inductor, said first capacitor, and said source being connected in series circuit, whereby a series resonant circuit is formed tuneable over said range of frequencies by said first capacitor, a second inductor in shunt with said source, said second inductor having a value to transform said internal impedance of said source to equivalent series values of resistance and reactance to provide said predetermined bandwidth at resonance at the high end of said range of frequencies, said equivalent value of resistance being substantially smaller than said internal impedance, and said equivalent value of reactance being substantially smaller than the reactance of said first inductor, a band rejection filter for rejecting a band of frequencies lying below said range of frequencies and providing a high pass filter for frequencies in the upper portion of said range, said band rejection filter including a third inductor and a second capacitor forming a parallel resonant circuit and including a fourth inductor and a third capacitor forming a series resonant circuit, said parallel and series resonant circuits being connected in series across said source, said parallel resonant circuit being tuned to resonance at the lower end of said rejection band and said series resistance circuit being tuned to resonance at the upper end of said rejection band, said third and fourth inductors being mutually coupled, said parallel resonant circuit providing equivalent capacitance and said series resonant circuit providing equivalent inductance at frequencies above said rejection band of frequencies, said equivalent capacitance and said equivalent inductance having values at the low end of said range of frequencies to provide a substantially constant value of equivalent resistance in series with said first inductor over said range of frequencies.

6. A tuned circuit for passing a band of frequencies constant in width over a range of frequencies comprising:

a first inductor, a second inductor, and a first variable capacitor, said inductors and said first capacitor connected in parallel to form a first parallel resonant circuit, said first capacitor having a range of capacitances resonant with said second inductor over said range of frequencies, a source of signals extending over said range of frequencies, said source being connected in series with said first inductor, a second capacitor connected in shunt with said first inductor to provide a second parallel resonant circuit tuned to parallel resonance at a frequency higher than the frequencies at the upper end of said range of frequencies whereby as the resonant frequency of said first parallel resonant circuit is increased the resultant impedance of said second resonant circuit is increased as a result of said second parallel resonant circuit operating closer to its resonant frequency whereby the Q of said first circuit is increased.

References Cited

UNITED STATES PATENTS

| | | | |
|---|---|---|---|
| 1,819,299 | 8/1931 | Miller | 333—77 X |
| 1,857,055 | 5/1932 | MacDonald | 333—77 X |
| 1,999,648 | 4/1935 | Bonanno | 333—77 X |
| 2,270,017 | 1/1942 | Brailsford | 333—77 X |
| 2,581,159 | 1/1952 | Achenbach | 333—77 X |
| 2,711,477 | 6/1955 | Bussard | 325—381 X |
| 2,714,192 | 7/1955 | Pan et al. | 333—77 X |
| 2,728,818 | 12/1955 | Mackey et al. | 330—155 |
| 2,756,393 | 7/1956 | Moulton | 333—77 X |
| 3,111,636 | 11/1963 | Ma | 333—77 X |
| 3,192,491 | 6/1965 | Hesselberth et al. | 333—76 X |
| 3,396,341 | 8/1968 | Von Fange | 333—77 X |

ELI LIEBERMAN, Primary Examiner

U.S. Cl. X.R.

334—83